(12) United States Patent
Wei (10) Patent No.: US 10,255,152 B2
(45) Date of Patent: Apr. 9, 2019

(54) GENERATING TEST DATA

(75) Inventor: Yong-Dong Wei, ShangHai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 976 days.

(21) Appl. No.: 13/982,706

(22) PCT Filed: Feb. 18, 2011

(86) PCT No.: PCT/CN2011/000255
§ 371 (c)(1),
(2), (4) Date: Jul. 30, 2013

(87) PCT Pub. No.: WO2012/109771
PCT Pub. Date: Aug. 23, 2012

(65) Prior Publication Data
US 2013/0311830 A1    Nov. 21, 2013

(51) Int. Cl.
| | | |
|---|---|---|
| G06F 11/00 | (2006.01) | |
| G06F 11/263 | (2006.01) | |
| G06F 11/07 | (2006.01) | |
| G03G 15/00 | (2006.01) | |
| G06F 11/36 | (2006.01) | |
| G06F 11/22 | (2006.01) | |
| G06F 16/90 | (2019.01) | |

(52) U.S. Cl.
CPC .......... *G06F 11/263* (2013.01); *G03G 15/55* (2013.01); *G06F 11/0748* (2013.01); *G06F 11/22* (2013.01); *G06F 11/2294* (2013.01); *G06F 11/3672* (2013.01); *G06F 11/3684* (2013.01); *G06F 16/90* (2019.01)

(58) Field of Classification Search
CPC .... G06F 11/263; G06F 11/2294; G06F 11/22; G06F 11/0748; G06F 11/3672; G06F 11/3684; G03G 15/55
USPC ...................................... 714/32, 46
See application file for complete search history.

(56) References Cited

U.S. PATENT DOCUMENTS

| | | | |
|---|---|---|---|
| 6,301,701 B1 | 10/2001 | Walker et al. | |
| 6,907,546 B1 * | 6/2005 | Haswell | G06F 11/3684 714/38.11 |
| 7,054,881 B2 | 5/2006 | Arcand et al. | |
| 2002/0042687 A1 * | 4/2002 | Tracy | G06F 21/577 702/119 |
| 2002/0116485 A1 * | 8/2002 | Black | H04L 29/06 709/223 |

(Continued)

FOREIGN PATENT DOCUMENTS

CN    1752945 A    3/2006

OTHER PUBLICATIONS

Dictionary definition for schema, retrieved from http://www.merriam-webster.com/dictionary/schema on Sep. 4, 2015.*

(Continued)

*Primary Examiner* — Yair Leibovich (57) ABSTRACT

A method of generating test data is provided herein. The method includes generating a schema comprising a database table. The method also includes receiving a selection of the database table. Additionally, the method includes receiving one or more rule definitions for populating the database table. The method further includes generating a stored procedure for populating the database table based on the rule definitions and the schema.

16 Claims, 7 Drawing Sheets

(56) References Cited

U.S. PATENT DOCUMENTS

| | | | |
|---|---|---|---|
| 2005/0015675 A1* | 1/2005 | Kolawa et al. | 714/38 |
| 2005/0131861 A1* | 6/2005 | Arritt | G05B 23/0264 |
| 2006/0224777 A1 | 10/2006 | Sand et al. | |
| 2006/0230083 A1 | 10/2006 | Allyn et al. | |
| 2007/0234121 A1* | 10/2007 | He et al. | 714/33 |
| 2008/0256111 A1 | 10/2008 | Haham et al. | |
| 2008/0301813 A1 | 12/2008 | Neystadt et al. | |
| 2009/0182756 A1 | 7/2009 | Kang et al. | |
| 2009/0319832 A1 | 12/2009 | Zhang et al. | |
| 2010/0125613 A1* | 5/2010 | Wiljanen | G06F 17/30038 707/803 |
| 2010/0185694 A1 | 7/2010 | Copty | |

OTHER PUBLICATIONS

Dictionary definition for schema, retrieved from https://en.wikipedia.org/wiki/Schema_(genetic_algorithms) on Sep. 4, 2015.*

Dictionary definition for database schema, retrieved from https://en.wikipedia.org/wiki/Database_schema on Sep. 4, 2015.*

Dictionary definition for schema, retrieved from https://en.wikipedia.org/wiki/Schema on Sep. 4, 2015.*

Wikipedia definition of "database dictionary" from date Feb. 14, 2010, retrieved using the way-back-machine, from https://web.archive.org/web/20100214182601/https://en.wikipedia.org/wiki/Data_dictionary.*

Wikipedia definition of "database schema" from date Feb. 13, 2010, retrieved using the way-back-machine, from https://web.archive.org/web/20100213215214/https://en.wikipedia.org/wiki/Database_schema.*

Zhang, Jian et al., Automatic Generation of Database Instances for White-box Testing, 2001, pp. 161-165 http://ieeexplore.ieee.org/stamp/stamp.jsp?arnumber=960612>.

EPO Search Report, Application No. 1185866.8-1879/2676202—PCT/CN2011000255, dated Dec. 19, 2017, 8 pages.

Jin, el al., "Generate Test Data for Database by using PowerDesigner," Computer Knowledge and Technology, Dec. 2006, 5 pages.

* cited by examiner

GENERATING TEST DATA

CROSS-REFERENCE TO RELATED APPLICATION

This application is a national stage application under 35 U.S.C. § 371 of PCT/CN2011/000255, filed Feb. 18, 2011.

BACKGROUND

Using mock data, or test data, is commonplace in many technical areas, such as application testing and report demonstrations. Test data is also useful for agile software development. In some cases, large volumes of test data are used to make testing more meaningful. Test data that approximates real-world production data improves the quality of the testing system. However, in many cases, an actual production environment is not available to provide real-world data for copying or modeling.

Some large-scale software products include test data generation and feeding mechanisms. Such mechanisms may install or uninstall test data. The feeding mechanisms may input the test data to the testing system. However, these mechanisms are often manual processes. As such, the work may be tedious and error-prone. Some test data tools merely insert data into a database. As such, the tools are run every time test data is needed. Further, software applications delivered with the tools included potentially implicate legal issues relating to whether specific uses are in compliance with license rights provided with the tools. Moreover, users must be trained to learn third party tools and to comply with legal requirements, increasing costs.

BRIEF DESCRIPTION OF THE DRAWINGS

Certain embodiments are described in the following detailed description and in reference to the drawings, in which.

DETAILED DESCRIPTION OF SPECIFIC EMBODIMENTS

As stated previously, feeding test data into databases has useful applications in many areas. Test data is also referred to as mock data herein. One approach to feeding test data involves stored procedures.

A stored procedure may be a subroutine available to applications accessing a relational database. Stored procedures may actually be stored in a database data dictionary, which enables the applications to call the stored procedures. Stored procedures are technical in nature. As such, a research and development team may develop, for example, SQL stored procedures. Stored procedures may readily store volumes of data into database tables.

Writing stored procedures manually may be difficult and time-consuming. Existing tools typically insert data into a database directly. As such, users run the tools every time test data is used. In an exemplary embodiment, stored procedures are generated automatically. These stored procedures may cover an entire data feeding process. In such an embodiment, an 80% savings in development effort was realized. Test packages typically engineered in a five day period, were engineered in a single day using an exemplary embodiment. Further, the test package of the exemplary embodiment had better quality and coverage than the typical test package.

There are some tools available, such as DBUnit, EMS Data Generator and SQL Tool Belt, for data feeding. However, these tools can not generate SQL script. Further, users run them every time test data is to be used. Another tool, Turbo Data, is capable of generating SQL script, but is limited to generating INSERT statements. Further, Turbo Data hard-codes all data references. As such, the size of the Turbo Data script may be large, difficult to read and, difficult to maintain.

In contrast, exemplary embodiments can generate stored procedures that are user-friendly, and easily maintained. Further, exemplary embodiments may include an automatic, graphical stored procedure generator. Exemplary embodiments may also support deleting and recycling of the stored procedures generated. Recycling stored procedures means to re-use the data generated in multiple testing phases. In various embodiments, a stored procedure may be scheduled to run every hour, day, month, etc. At each period specified, the stored procedure may be re-run to re-generate the test data based on a specified rule.

Figure 1:
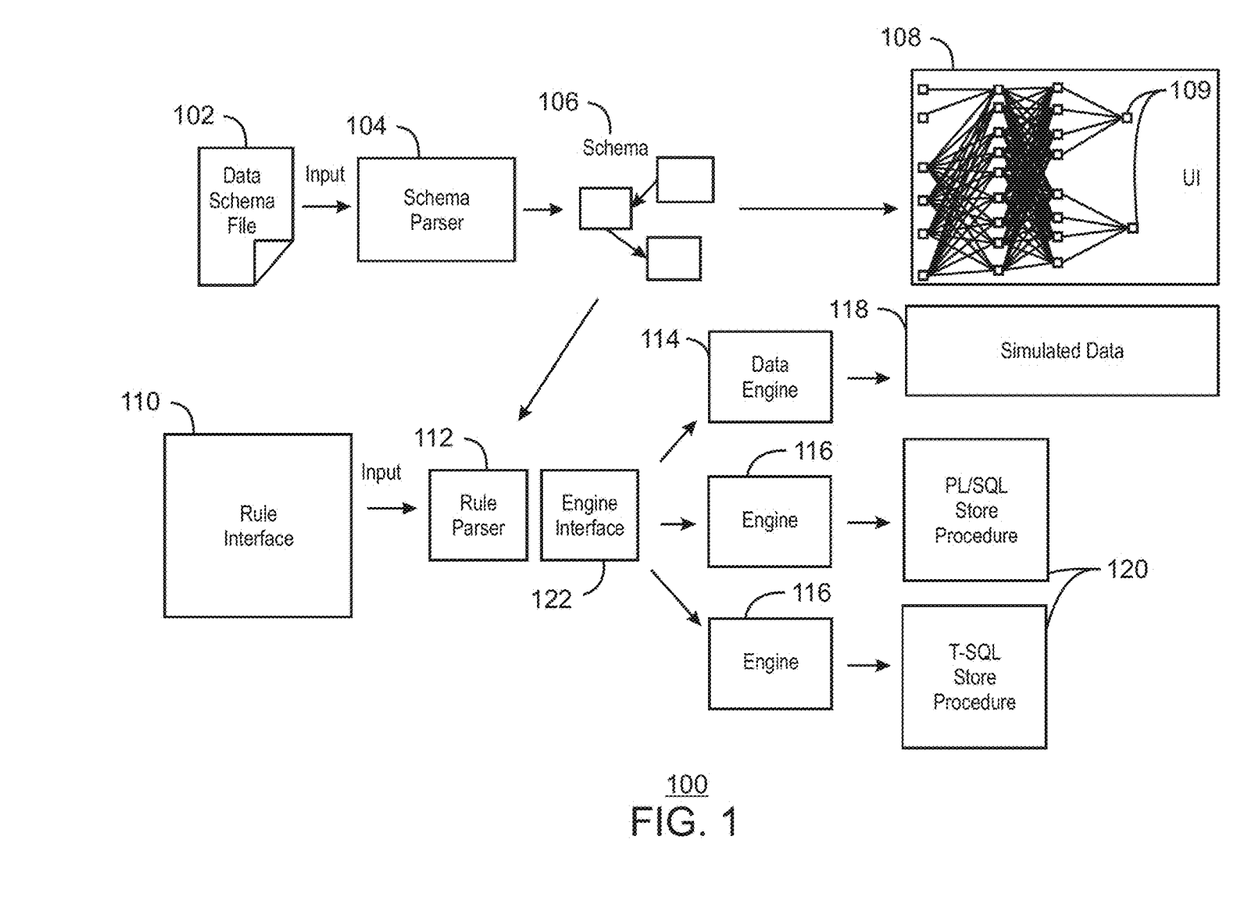
FIG. 1 is a block diagram of a system for test data in accordance with an embodiment of the invention.

FIG. 1 is a block diagram of a system 100 for test data in accordance with an embodiment of the invention. The system 100 may enable a user to perform an entire data feeding process. The system 100 may include may include a data schema file 102, a schema parser 104, a schema 106, an interface 108, a rule interface 110, a rule parser 112, a data engine 114, and stored procedure engines 116.

The schema parser 104 may translate the data schema file 102 for a database into a schema 106. The schema 106 may be used to generate a visual representation, e.g., interface 108, of the tables 109 and relationships in the database. The user may select a table 109 from the interface 108.

In response, the rule interface 110 may be displayed, where the user may define rules for each column of the selected table. The rule parser 112 then parses these rules. Each type of rule may map to a callback class. The rule parser may call the callbacks that are provided by a registered parser engine, such as the data engine 114 and the stored procedure engines 116.

The rule interface 110 may enable users to define rules for generating mock data. Rules may include, for example, operators that create numeric values to distinguish different rows of test data. A command, such as "count +−*/3" may create values such as (row3, row 6 . . . ). Another command, specified "'a'||'bb'" may concatenate strings in the rows of test data. Rules may also include String lists, such as {Beijing; London} and String ranges, e.g, {Location21~30}; functions, such as rand( ) and cast( ) column references, such as [other column name]; and business keys.

The business key may be a primary key of a table. The rule parser 112 may interpret the specified rules to facilitate generating mock data.

The data engine 114 may generate mock data based on the specified rules. In an exemplary embodiment, the data engine 114 may provide simulated data 118. The simulated data 118 may be a preview of the generated mock data. In various embodiments an interface may be provided enabling the user to select data for insertion to the database.

In an embodiment, the stored procedure engines 116 may, based on the specified rules, generate stored procedures 120 automatically. The stored procedures 120 may be called by the user to generate test data. As such, the users may populate test data by calling a specific stored procedure 120 from the database. A different stored procedure engine 116 may be provided for different types of databases, e.g., databases that use PL/SQL versus T-SQL. In an exemplary embodiment, the user may extend the stored procedure engines 116 to support additional databases by registering new stored procedure engines 116 for specified databases. The following structured query language (SQL) provides one example of a stored procedure that may be generated by the stored procedure generator:

```
DECLARE VARIABLE_A INTEGER;
DECLARE VARIABLE_B INTEGER;
SET VARIABLE_A = 2
SET VARIABLE_B = 2;
SET TEMP_VARIABLE1 = 0;
WHILE (TEMP_VARIABLE1 < VARIABLE_A)
LOOP
  SET TEMP_STRING = 'Component' + CAST(TEMP_VARIABLE1 +
  1 AS VARCHAR);
  SET TEMP_VARIABLE2 = 0;
  WHILE . . .
SQL 1
```

In an exemplary embodiment, the system 100 may be a full component-based architecture. Further, the schema parser 104 may be extended to support various types of data schema files 102, e.g., schema definitions specific to particular vendors.

In particular, the system 100 may also include an engine interface 122. With the engine interface 122, the user may register an engine, such as the data engine 114 or one of the stored procedure engines 116. The engine interface 122 may allow for extensions of various embodiments. As such, using the same input (the rules), different outputs may be generated: the simulated data 118, the PL/SQL stored procedure 120, or the T-SQL stored procedure 120.

Figure 2:
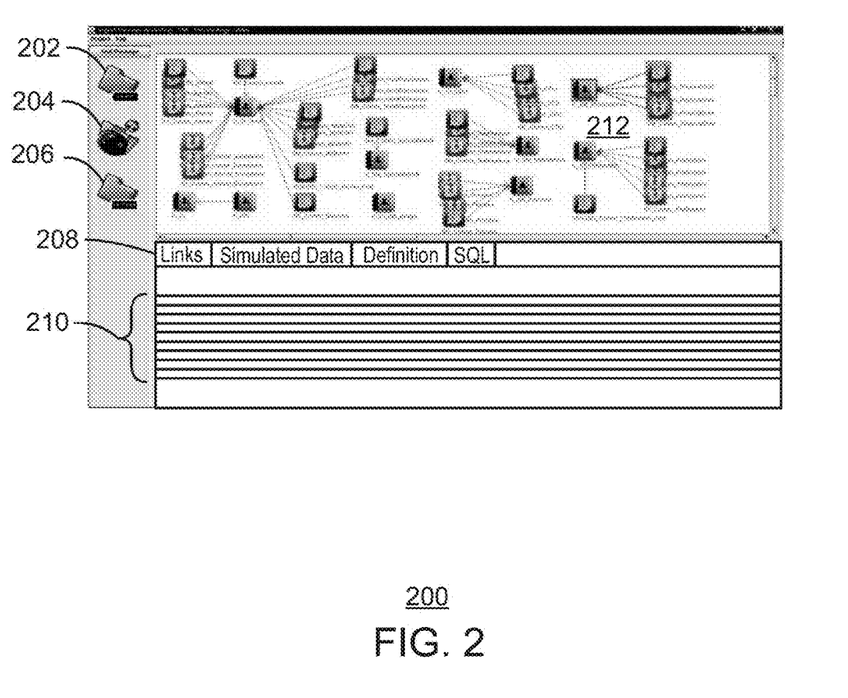
FIG. 2 is a block diagram of an interface for test data in accordance with an embodiment of the invention.

FIG. 2 is a block diagram of an interface 200 for test data in accordance with an embodiment of the invention. The user interface 200 may enable the user to select options relevant to the schema parser 104, the rule parser 112, and the data engine 114. As shown, the interface includes icons 202, 204, 206. The icons 202 may be clickable to open the rule interface 110. The icon 204 may be clickable to generate a stored procedure 120. The icon 206 may be clickable to manage the stored procedures 120.

The interface 200 may also include tabs 208, a work area 210, and a display area 212. The display area 212 may be used to display, for example, a schema of database tables 109. Each table 109 may be shown as an icon. In various embodiments a table may be selected along with a tab 208 to work in the work area 210. For example, once a table is selected, the user may select from one of the following tabs 208: "Links, Simulated Data, Definition, and SQL." In response to selecting "Links," the work area 210 may list all tables 109 with a link to the selected table 109. In response to selecting "Simulated data," the work area 210 may show the simulated data 118 for the selected table 109. In response to selecting "Definition," the work area 210 may enable the user to select tables into which the stored procedure 130 inserts test data. In response to selecting "SQL," the work area 210 may display the auto generated SQL script of the stored procedures 120 for the selected table 109.

Figure 3:
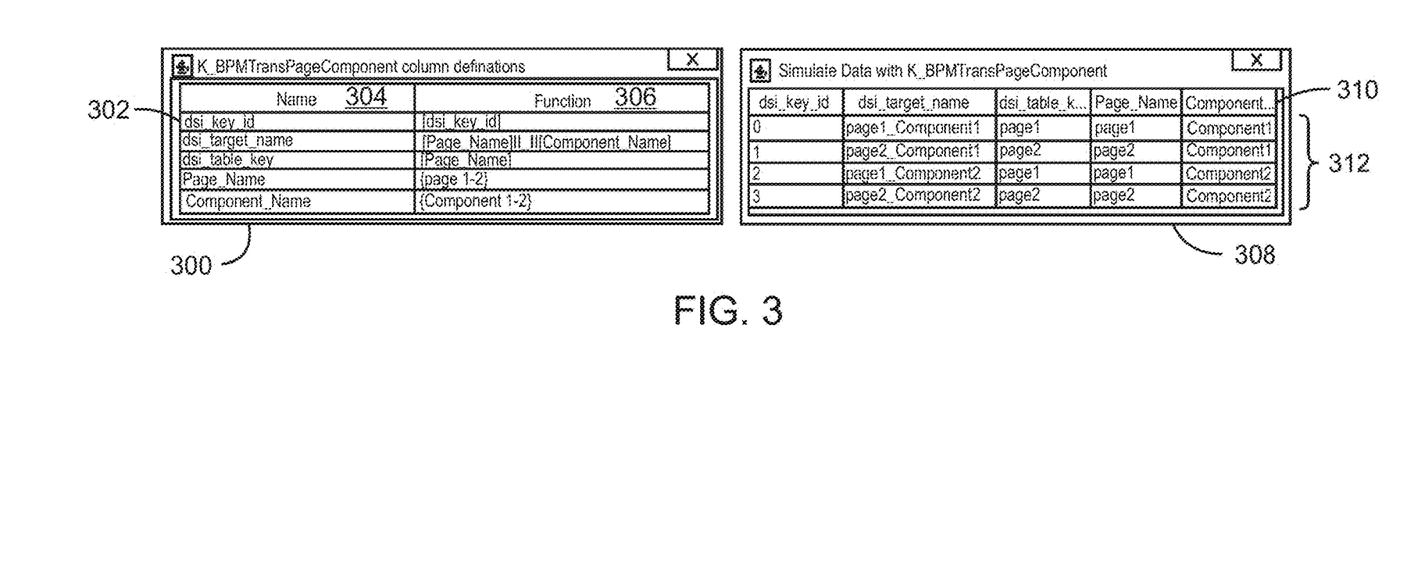
FIG. 3 is a block diagram of an interface for test data in accordance with an embodiment of the invention.

FIG. 3 is a block diagram of interfaces 302, 308 for test data in accordance with an embodiment of the invention. The rule interface 302 may enable a user to specify rules for test data generation. The mock data interface 308 may enable a user to preview, modify, and select test data generated by the data engine 114 (FIG. 1).

As shown, the rule interface 302 may include names 304 of columns in a table selected for test data generation. For each column name, e.g., "dsi_key_id," the user may specify a function 306. The function 306 may be a rule for generating test data values for the corresponding column.

The mock data interface 308 may include names 310 of each column specified in the rules interface. The rows 312 may represent each row of test data generated by the data engine 114. As stated previously, the user may use the mock data interface 308 to select, modify test data to be inserted into the database. In one embodiment, the user may make changes to the specified rules after previewing test data in the interface 308.

After providing rules for a table, the user may choose to calculate the preview data with the data engine 114 to check the preview result in the mock data interface 308. If errors are found, the user may return to the rule interface 302 to modify the rules until an expected result is generated. In one embodiment, the users may select previewed data for direct insertion into the database.

Figure 4:
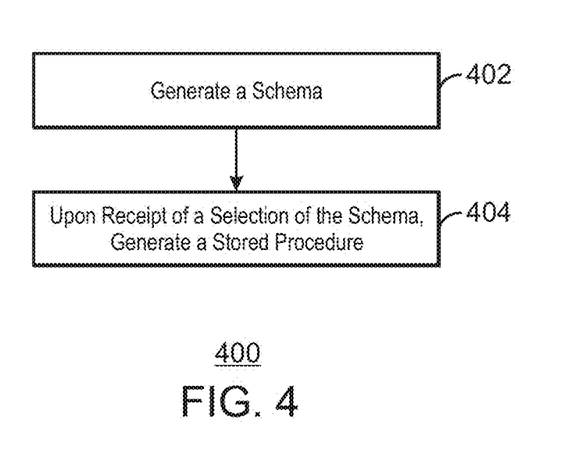
FIG. 4 is a process flow diagram of a method for generating test data in accordance with an embodiment of the invention.

FIG. 4 is a process flow diagram of a method 300 for test data in accordance with an embodiment of the invention. It should be understood that the process flow diagram is not intended to indicate a particular order of execution. Referring also to FIG. 1, the method 400 may be performed by the schema parser 104 or the stored procedure engine 116.

The method 400 begins at block 402, where the schema 106 may be generated. The schema 106 may specify one or more database tables 109.

At block 404, upon receipt of a selection of the schema, the stored procedure 120 may be generated. The selection may specify one or more database tables 109 to be populated with test data. When executed, the stored procedure 120 may populate the database tables 109 specified in the selection. The database tables 109 may be populated with test data that is generated based on rule definitions and the schema. The method 400 is described in greater detail with reference to FIG. 5.

Figure 5:
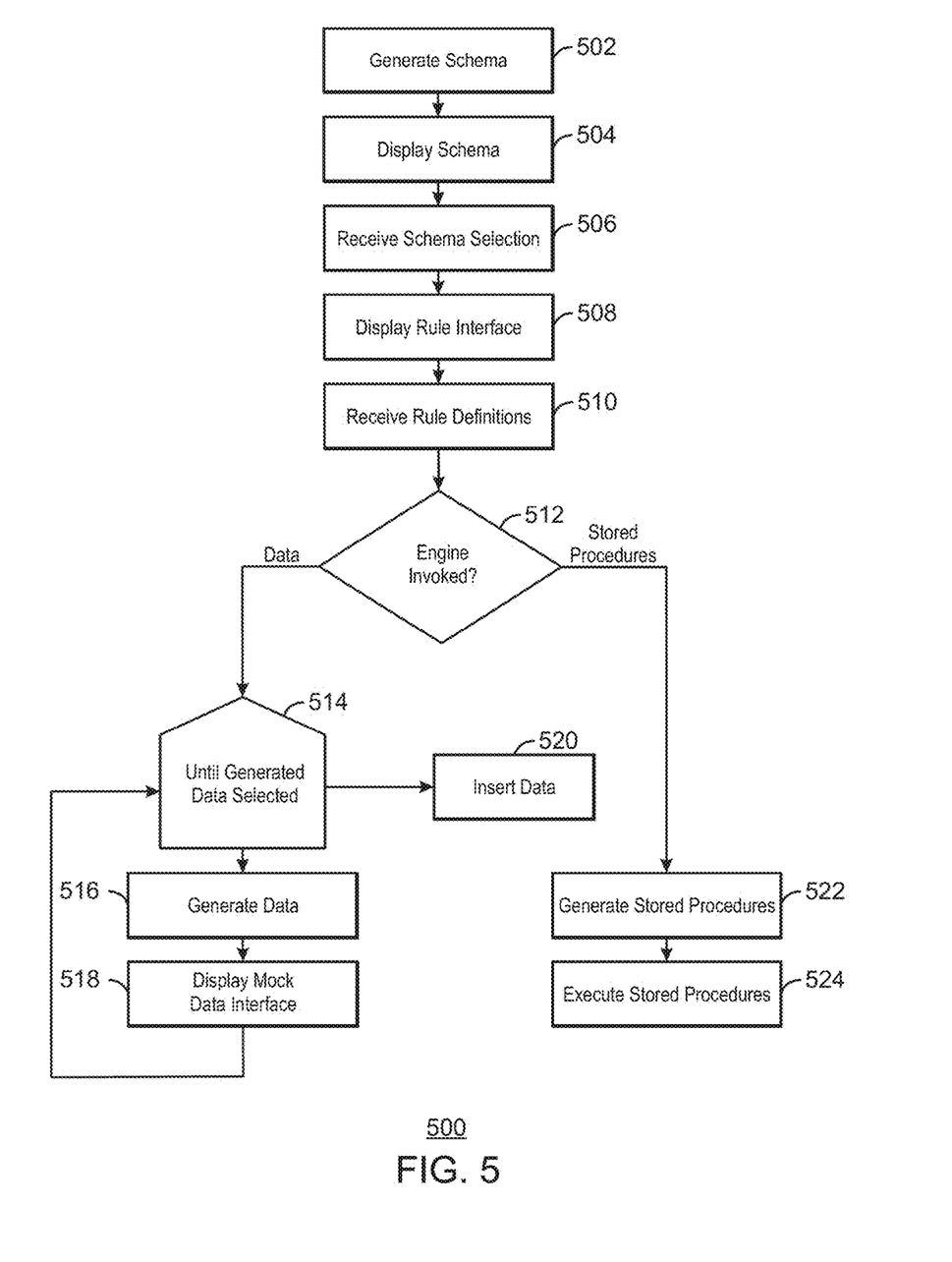
FIG. 5 is a process flow diagram of a method for generating test data in accordance with an embodiment of the invention.

FIG. 5 is a process flow diagram of a method 500 for test data in accordance with an embodiment of the invention. It should be understood that the process flow diagram is not intended to indicate a particular order of execution. Referring also to FIG. 1, the method 500 may be performed by the schema parser 104, the rule parser 112, the data engine 114, or the stored procedure engine 116.

The method 500 begins at block 502, where the schema parser 104 may generate the schema 106. The schema parser 104 may read the data schema files 102 and retrieve the definition of each database table 109. The definitions may be passed to the rule parser 112.

At block 504, the schema parser 104 may display the schema 106 graphically in the interface 108. The display may occur at the same time the definitions are passed to the rule parser 112. As stated previously, the user may select one or more tables 109 from the interface 108 for test data generation.

At block 506, the rule parser 112 may receive the schema selection. At block 508, the rule parser 112 may display the rule interface 110, 302. At block 510, the rule parse may receive the rule definitions specified by the user.

At block 512, the data engine 114 or the stored procedures engine 116 may be invoked based on a user selection. If the data engine 114 is invoked, blocks 514-418 may be repeated until test data is selected for insertion into the database. At block 516, test data may be generated based on the specified rules. At block 518, the mock data interface 308 may be displayed. Once test data is selected, at block 520 the selected test data may be inserted into the database.

If, instead of the data engine 114, the stored procedures engine 116 is selected, at block 522 the stored procedure 120 may be generated for the appropriate database. At block 524, the stored procedure may be executed.

Figure 6:
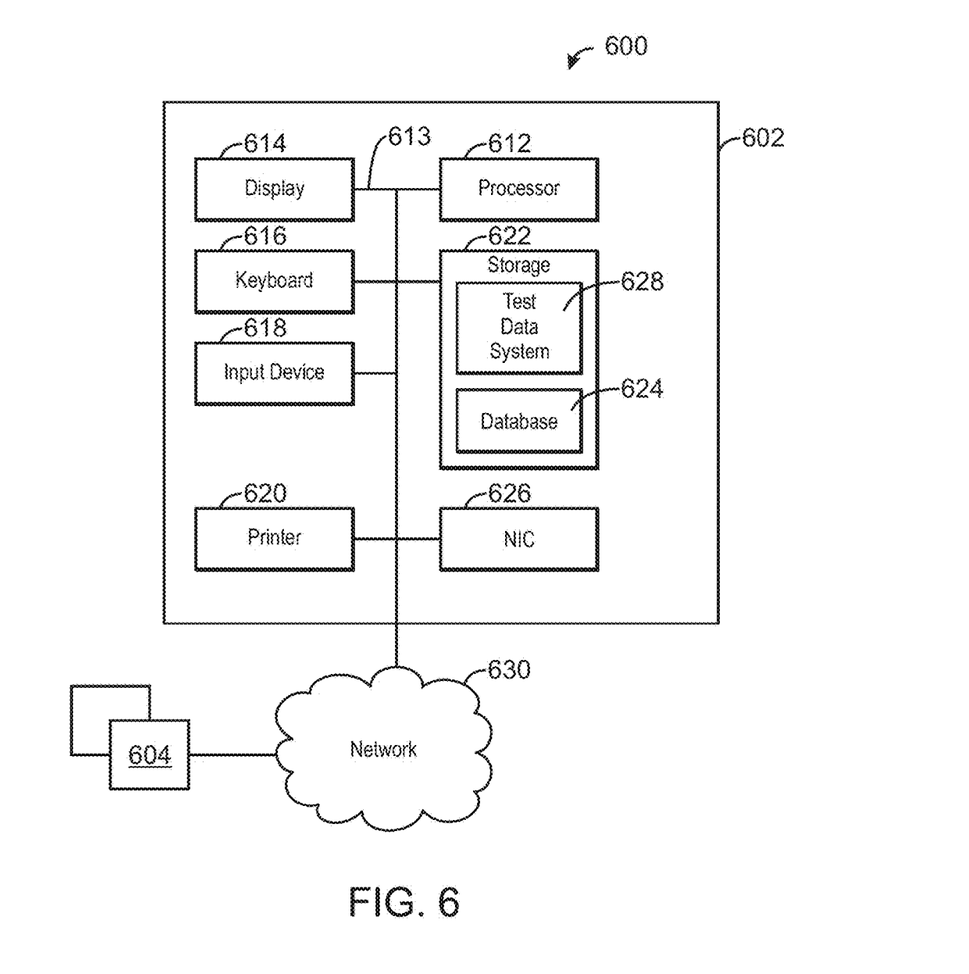
FIG. 6 is a block diagram showing a system for generating test data in accordance with an embodiment of the invention.

FIG. 6 is a block diagram of a system for generating test data in accordance with an embodiment of the invention. The system is generally referred to by the reference number 600. Those of ordinary skill in the art will appreciate that the functional blocks and devices shown in FIG. 6 may comprise hardware elements, software elements, or some combination of software and hardware. The hardware elements may include circuitry. The software elements may include computer code stored on a non-transitory, computer-readable medium.

Additionally, the functional blocks and devices of the system 600 are but one example of functional blocks and devices that may be implemented in an embodiment of the invention. Those of ordinary skill in the art would readily be able to define specific functional blocks based on design considerations for a particular electronic device.

The system 600 may include servers 602, 604, in communication over a network 630. The server 604 may be similarly configured to the server 602. For example, the server 602 may include one or more processors 612, which may be connected through a bus 613 to a display 614, a keyboard 616, one or more input devices 618, and an output device, such as a printer 620. The input devices 618 may include devices such as a mouse or touch screen. The server 602 may also be connected through the bus 613 to a network interface card 626. The network interface card 626 may connect the database server 602 to the network 630.

The network 630 may be a local area network, a wide area network, such as the Internet, or another network configuration. The network 630 may include routers, switches, modems, or any other kind of interface device used for interconnection. In one example embodiment of the invention, the network 630 may be the Internet.

The server 602 may have other units operatively coupled to the processor 612 through the bus 613. These units may include non-transitory, computer-readable storage media, such as storage 622. The storage 622 may include media for the long-term storage of operating software and data, such as hard drives. The storage 622 may also include other types of non-transitory, computer-readable media, such as read-only memory and random access memory.

The storage 622 may include the software used in embodiments of the present techniques. In an embodiment of the invention, the storage 622 may include a database 624 and a test data system 628. The test data system 628 may enable a user to populate the database 624 with test data. Alternatively, the test data system 628 may generate stored procedures 120 that populate the database 624 with test data. The test data system 628 may include interfaces for selecting tables, specifying rules, and previewing generated test data.

Figure 7:
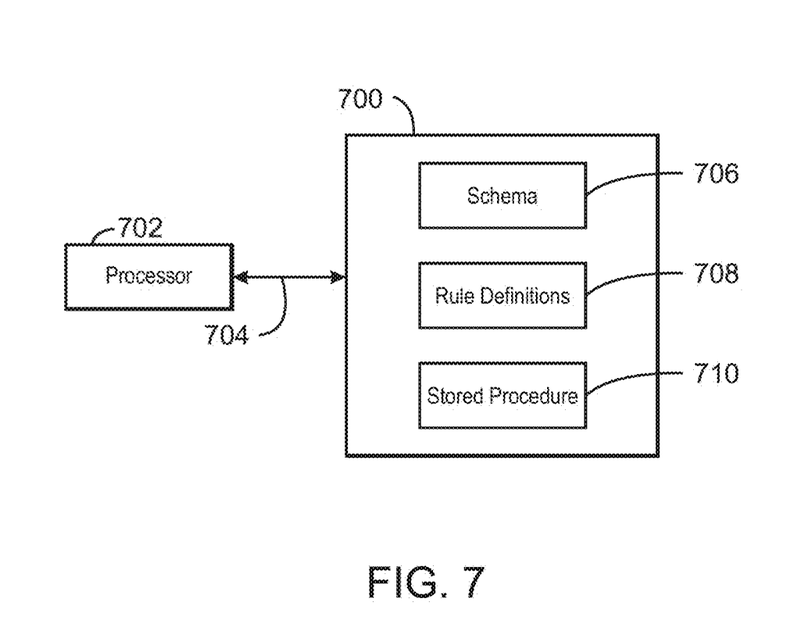
FIG. 7 is a block diagram showing a non-transitory, computer-readable medium that stores code for generating test data in accordance with an embodiment of the invention

FIG. 7 is a block diagram of a tangible, machine-readable medium that stores code adapted to generate test data according to an exemplary embodiment of the present invention. The tangible, machine-readable medium is generally referred to by the reference number 700.

The tangible, machine-readable medium 700 may correspond to any typical storage device that stores computer-implemented instructions, such as programming code or the like. For example, the storage device may include a hard disk drive, a magnetic disk drive, e.g., to read from or write to a removable magnetic disk, and an optical disk drive, e.g., for reading a CD-ROM disk or to read from or write to other optical media.

The storage device may be connected to a system bus by a storage device interface, such as a hard disk drive interface, a magnetic disk drive interface and an optical drive interface. For example, the storage device may be the storage 622.

Although the description of computer-readable media above refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, Bernoulli cartridges, and the like.

When read and executed by a processor 702 via a communication path 704, the instructions stored on the tangible, machine-readable medium 700 are adapted to cause the processor 702 to generate test data according to an exemplary embodiment of the present invention, as described herein.

A schema 706 may be displayed graphically. The schema 706 may include a database table. The schema 706 may be selectable by selecting a visual representation of the database table. A rules interface may be displayed in response to receiving a selection of the schema 706. The rules interface may receive rule definitions 708 for populating the database table. A stored procedure 610 may be generated to populate the database table. The database table may be populated with test data generated based on the rule definitions 708 and the schema 706.

What is claimed is:

1. A computer-implemented method for improving generation of test data comprising:
   generating a schema comprising a plurality of database tables stored in data storage;
   presenting a graphical display of the schema including visual representations of the plurality of database tables and relationships between the plurality of database tables;
   receiving a selection of a database table of the schema presented in the graphical display from a user;
   in response to a receipt of the selection of the database table automatically generating a stored procedure for populating the database table with test data, wherein generating the stored procedure comprises receiving from the user, via a rule interface shown on a display, a rule definition including a function for computing at least a portion of the test data based on a column of the database table; and
   executing, by a processor, the stored procedure to populate the database table with the test data, wherein executing the stored procedure comprises generating the test data based on the rule definition, user modifications, and the schema, wherein the database table and the stored procedure are included in a relational database.

2. The method recited in claim 1, comprising, after generating the stored procedure in response to the receipt of the selection of the database table, storing the stored procedure in a data dictionary of the relational database.

3. The method recited in claim 1, wherein the graphical display of the schema includes visual representations of a plurality of database tables and visual representations of relationships between the plurality of database tables.

4. The method recited in claim 1, comprising generating one or more rows in the database table with the test data.

5. The method recited in claim 4, comprising causing a display of the one or more rows.

6. The method recited in claim 5, comprising receiving a selection of one of the one or more rows.

7. The method recited in claim 6, comprising receiving a request for the selected row, wherein the request specifies one of:
   a modification to the selected row;
   a deletion of the selected row;
   an insertion of the selected row into the database table; or
   combinations thereof.

8. The method recited in claim 7, comprising one of:
   modifying the selected row based on the request;
   deleting the selected row based on the request;
   inserting the selected row into the database table based on the request; or
   combinations thereof.

9. A computer system to improve the generation of test data comprising:
   a memory storing instructions; a processor to execute the instructions to:
   generate a schema comprising database tables; receive a selection of the schema from a user;
      present a graphical display of the schema including visual representations of the database tables and visual representations of relationships between the database tables;
      receive a selection of a database table presented in the graphical display; in response to a receipt of the selection of the schema and the database table, generate a stored procedure to populate the database table with test data; execute the stored procedure to:
      generate the test data based on rule definitions and the schema; populate the database table with the test data, wherein the database table and the stored procedure are included in a relational database.

10. The computer system recited in claim 9, wherein the processor is to execute the instructions to store the stored procedure in a data dictionary of the relational database.

11. The computer system recited in claim 9, wherein the processor is to execute the instructions to cause a display of a rules interface in response to receiving the selection, wherein the rules interface receives the rule definitions.

12. The computer system recited in claim 9, wherein the processor is to execute the instructions to:
   generate one or more rows for the database table, wherein the rows are generated based on the rule definitions and the schema; and
   cause a display of the one or more rows.

13. A non-transitory, computer-readable medium comprising machine-readable instructions to improve the generation of test data and executable by a processor to:
   generate a schema comprising a plurality of database tables;
   cause a graphical display of the schema, wherein the graphical display of the schema includes visual representations of the plurality of database tables and visual representations of relationships between the plurality of database tables, and wherein the schema is selectable by selecting the visual representation of a database table of the plurality of database tables from the graphical display;
   receive a selection of the schema from a user;
   in response to a receipt of the selection of the schema, generate a stored procedure to populate the database table with test data;
   execute the stored procedure to:
      generate the test data based on rule definitions and the schema; and populate the database table with the test data.

14. The non-transitory, computer-readable medium recited in claim 13, wherein the machine-readable instructions comprise machine-readable instructions that cause the processor to:
   generate one or more rows for the database table, wherein the rows are generated based on the rule definitions and the schema;
   cause a display of the rows;
   receive a selection of one of the rows;
   receive a request for the selected row, wherein the request specifies one of:
      a modification to the selected row;
      a deletion of the selected row;
      an insertion of the selected row into the database table; or
      combinations thereof; and
   perform, based on the request, one of:
      modifying the selected row;
      deleting the selected row;
      inserting the selected row into the database table; or
      combinations thereof.

15. A non-transitory, computer-readable medium comprising machine-readable instructions to improve the generation of test data and executable by a processor, wherein the machine-readable instructions, when executed by the processor, cause the processor to:
   generate a schema comprising a database table;
   cause a graphical display of the schema, the schema being selectable by selecting a visual representation of the database table;
   cause a display of a rules interface in response to receiving a selection of the schema, wherein the rules interface receives rule definitions for populating the database table;
   generate a stored procedure to populate the database table, wherein the database table is populated with test data generated based on the rule definitions and the schema; and populate the database table using the stored procedure,
   wherein the database table and the stored procedure are included in a relational database.

16. A non-transitory, computer-readable medium comprising machine-readable instructions to improve the generation of test data and executable by a processor, wherein the machine-readable instructions, when executed by the processor, cause the processor to:
   generate a schema comprising a database table; receive a selection of the schema from a user;
      in response to a receipt of the selection of the schema, automatically generate a stored procedure for populating the database table with test data, wherein generating the stored procedure comprises receiving from the user via a rule interface, a rule definition including a function for computing at least a portion of the test data based on a column of the schema; and execute the stored procedure to populate the database table with the test data, wherein executing the stored procedure comprises generating the test data based on the rule definitions, user modifications, and the schema, wherein the database table and the stored procedure are included in a relational database.

* * * * *